United States Patent
Bess et al.

(10) Patent No.: US 7,114,786 B2
(45) Date of Patent: Oct. 3, 2006

(54) TRAILER BRAKE SYSTEM AND METHOD

(76) Inventors: Charles G. Bess, 108 W. Main St., Hardy, AR (US) 72542; Ken D. Burgin, 6735 W. County Road 448, Manistique, MI (US) 49854

(*) Notice: Subject to any disclaimer, the term of this patent is extended or adjusted under 35 U.S.C. 154(b) by 0 days.

(21) Appl. No.: 10/936,388

(22) Filed: Sep. 8, 2004

(65) Prior Publication Data

US 2006/0049686 A1    Mar. 9, 2006

(51) Int. Cl.
*B60T 13/00* (2006.01)
(52) U.S. Cl. .................. 303/7; 303/DIG. 3; 188/112 A; 188/112 R; 60/545
(58) Field of Classification Search .................. 303/7, 303/123, DIG. 3, DIG. 4, 15, 162; 188/3 R, 188/3 H, 112 R, 112 A; 60/545; 307/10.1
See application file for complete search history.

(56) References Cited

U.S. PATENT DOCUMENTS

| | | | |
|---|---|---|---|
| 2,203,908 A | 6/1940 | Hess | |
| 3,034,598 A * | 5/1962 | Lafaye | 188/3 R |
| 3,048,976 A * | 8/1962 | Grisby et al. | 60/545 |
| 3,631,389 A | 12/1971 | Elliott | |
| 3,665,389 A | 5/1972 | Winston et al. | |
| 3,768,870 A * | 10/1973 | Howard | 303/7 |
| 3,823,985 A * | 7/1974 | Hubbard | 303/7 |
| 3,887,238 A | 6/1975 | Bennett | |
| 4,077,487 A * | 3/1978 | Misinchuk | 180/78 |
| 4,122,434 A | 10/1978 | Jensen | |
| 4,370,714 A | 1/1983 | Rettich et al. | |
| 4,573,350 A | 3/1986 | Anderson | |
| 4,828,332 A * | 5/1989 | Lohberg | 303/113.3 |
| 5,251,966 A * | 10/1993 | Friederichs et al. | 303/7 |
| 5,302,008 A * | 4/1994 | Miyake et al. | 303/14 |
| 5,382,085 A | 1/1995 | Zbinden | |
| 5,709,435 A * | 1/1998 | Wood | 303/7 |
| 5,836,659 A | 11/1998 | Feigel et al. | |
| 5,927,825 A | 7/1999 | Schenk et al. | |
| 6,079,792 A * | 6/2000 | Kessler | 303/7 |
| 6,155,385 A * | 12/2000 | Basnett | 188/72.7 |
| 6,230,492 B1 * | 5/2001 | Kingston et al. | 60/545 |
| 6,394,558 B1 | 5/2002 | Cords | |
| 6,416,138 B1 | 7/2002 | Barnett | |
| 6,634,724 B1 * | 10/2003 | Kobayashi et al. | 303/155 |
| 6,666,527 B1 * | 12/2003 | Gill et al. | 303/7 |
| 6,874,602 B1 * | 4/2005 | Greaves, Jr. | 188/112 R |
| 2002/0195870 A1 * | 12/2002 | Brunson et al. | 303/7 |
| 2004/0251095 A1 * | 12/2004 | Simard et al. | 188/156 |

* cited by examiner

*Primary Examiner*—Xuan Lan Nguyen
(74) *Attorney, Agent, or Firm*—J. Charles Dougherty (57) ABSTRACT

An electric-over-hydraulic braking system for trailers and towed vehicles is disclosed. The system comprises off-the-shelf components, such as a standard linear actuator and master cylinder, for reduced cost and greater reliability. In a dual master cylinder configuration, the braking system controller calculates an average pressure across each channel, and compares that value to a control signal from an in-cab controller. The linear actuator is extended or retracted in response to a signal proportional to this difference. The system may include break-away functionality, as well as diagnostics to indicate low pressure and transducer circuit malfunction conditions.

19 Claims, 6 Drawing Sheets

TRAILER BRAKE SYSTEM AND METHOD

BACKGROUND OF THE INVENTION

The present invention relates to vehicle braking systems, and in particular to braking systems for trailers and towed vehicles.

Although it is common for vehicles to pull light trailers without the addition of a brake system to the trailer, heavier trailers and other towed vehicles generally require a separate braking system due to their inertia. These heavier trailers and vehicles include, by way of example, house trailers, recreational trailers, horse trailers, car trailers, and the like. (All such trailers and other towed vehicles will be generally referred to henceforward simply as "trailers.") Without supplemental braking systems for heavier trailers, it may be difficult or impossible for an operator to maintain control of a vehicle-trailer combination during braking. This problem is particularly acute with respect to recreational trailers, since they may be pulled by non-commercial vehicles with less-capable braking systems, and because recreational trailers are commonly pulled through steeply inclined mountainous areas that are popular destinations for recreational vehicle owners. In addition, various state laws contain minimum requirements concerning the braking ability and functionality of recreational trailers and other trailer types, generally requiring supplemental braking systems once a trailer surpasses a certain weight.

Supplemental trailer braking systems are generally operated either by an independent control system located in the towing vehicle, or by actuation of the towing vehicle braking system through a coupling of the towing vehicle braking system with the trailer brakes. A coupled braking system is highly desirable because it may function in an essentially automatic mode, freeing the operator of the towing vehicle from the requirement of independently operating two separate braking systems. The resulting ease of operation is particularly important in applications such as recreational trailers, where the operator is generally not a professional driver and may spend a relatively small amount of time driving a vehicle with a heavy trailer. In order for the operator to maintain control of the vehicle-trailer combination, however, precisely coordinated braking is required. If, for example, the trailer brake system should brake harder than the towing vehicle, the trailer may begin to skid and the operator may lose control. Conversely, if the towed vehicle brakes harder than the trailer, the trailer may jackknife, again causing loss of control that may lead to vehicle damage or serious injury. Even if control of the vehicle is not fully lost due to uncoordinated braking problems, the inertia of the heavy trailer may cause the stopping distance of the vehicle/trailer combination to be greatly increased, which also raises a serious safety concern particularly with respect to a relatively inexperienced operator.

A typical supplemental trailer braking system applicable for use in connection with recreational trailers and the like is described in U.S. Pat. No. 4,370,714 to Rettich et al. This system is an "electro-hydraulic" or "electric-over-hydraulic" braking system, that is, a system that uses electrical control signals in order to operate hydraulically-powered brakes. Hydraulic pressure to the trailer brakes is controlled by selectively opening and closing solenoid valves in the trailer hydraulic system. The hydraulics are self-contained within the trailer, so that no interconnections between the towing vehicle and the trailer are required other than electrical connections. The trailer brakes are operated by means of a signal from a pressure transducer connected to the master brake cylinder of the towing vehicle. A pressure transducer in the towed vehicle provides an electrical feedback signal. The control signal and feedback signal are compared to produce an error signal. The brake system coupling is achieved by the effort of the trailer brake control system to minimize this error signal.

U.S. Pat. No. 6,416,138 to Barnett describes another electro-hydraulic, self-contained brake system for trailers. Hydraulic pressure in this system is provided through the operation of an electric motor in a complex arrangement involving a gear and threaded rod. The electric motor operates in response to the signal from a pressure sensor in communication with the master cylinder.

U.S. Pat. No. 5,382,035 to Zbinden describes another electrical control system for hydraulic brakes on a trailer, which includes an electric motor for controlling pressure on a pressure accumulator. The pressure accumulator feeds a fluid control circuit including a pressure-limited valve, which controls a braking jack that actuates the trailer brakes.

Each of these systems suffer from important disadvantages. First, each of these systems are complex, involve a significant number of moving parts, and require the fabrication of customized mechanical components in their construction. Each of these factors increases the cost associated with these brake control systems, and reduces the likely reliability of these systems. What is desired then is a simple, inexpensive control system for a trailer braking system that may be constructed from "off the shelf" mechanical parts, and which is operable to reliably brake a trailer in coordination with and in proportion to the braking applied by the operator of the towing vehicle.

In addition, the systems described above inherently exhibit a brake release signal response time that is slower than the response time to a signal indicating that brakes should be applied. It would be desirable to develop a braking system that can respond very rapidly to both a signal to apply the brakes and a signal to release the brakes.

BRIEF SUMMARY OF THE INVENTION

The present invention is directed to a brake activation system for trailers that overcomes the limitations of the prior art systems. The system comprises a simple linear actuator to drive a hydraulic master cylinder. This arrangement of a linear actuator and master cylinder results in an inherently quick response time to a brake release signal. The control module for the system utilizes an input conditioning circuit to convert a variable pulse-width DC signal to an analog signal, while maintaining a correct inductive and resistive load. A proportional performance synchronizer analyzes and compares signals to a reference voltage to produce an output signal to operate the linear actuator, causing it to move its extendible arm forward or backward and thereby drive the dual-channel master cylinder through an interconnection with the master cylinder bore. As a result, pressure is applied to the brake calipers in communication with the master cylinder in direct proportion to the controller output. The present invention further in some embodiments comprises a diagnostic system to report on each of the two channels, to indicate either sufficient pressure in a hydraulic circuit, a low pressure condition in a hydraulic circuit, or a circuit malfunction condition.

It is therefore an object of the present invention to provide for a braking system for a trailer that utilizes relatively few moving parts.

It is a further object of the present invention to provide for a braking system for a trailer that utilizes standardized mechanical parts for increased reliability and lower cost of production.

It is also an object of the present invention to provide for a braking system for a trailer that produces a braking effect that is directly proportional to a control signal.

It is also an object of the present invention to provide for a braking system for a trailer that utilizes multiple hydraulic channels for safety.

It is also an object of the present invention to provide for a braking system for a trailer that responds rapidly to both a signal to apply the trailer brakes and a signal to release the trailer brakes.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENTS

Figure 1:
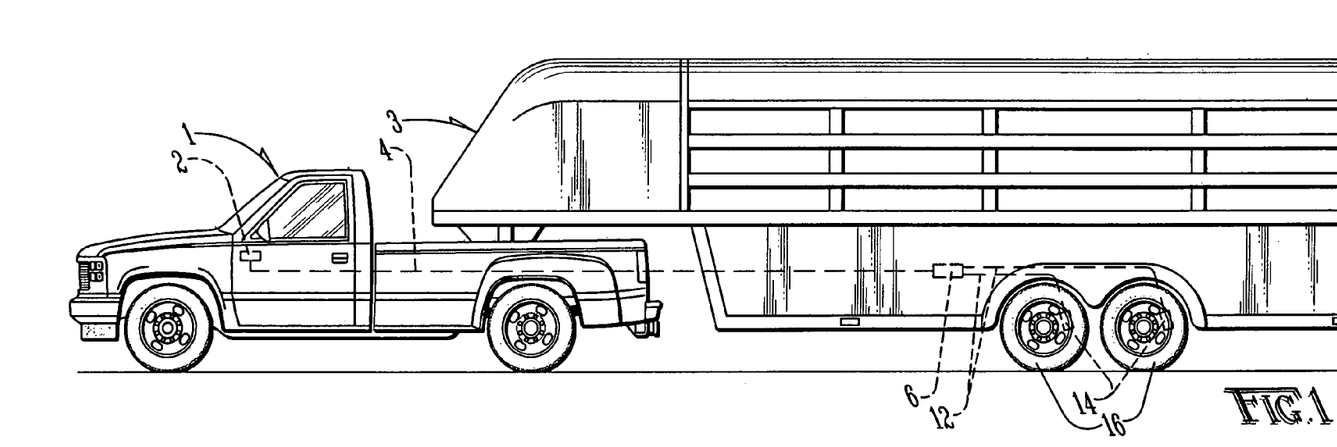
FIG. 1 is a side elevational view showing major components of a preferred embodiment of the present invention.
Figure 2:
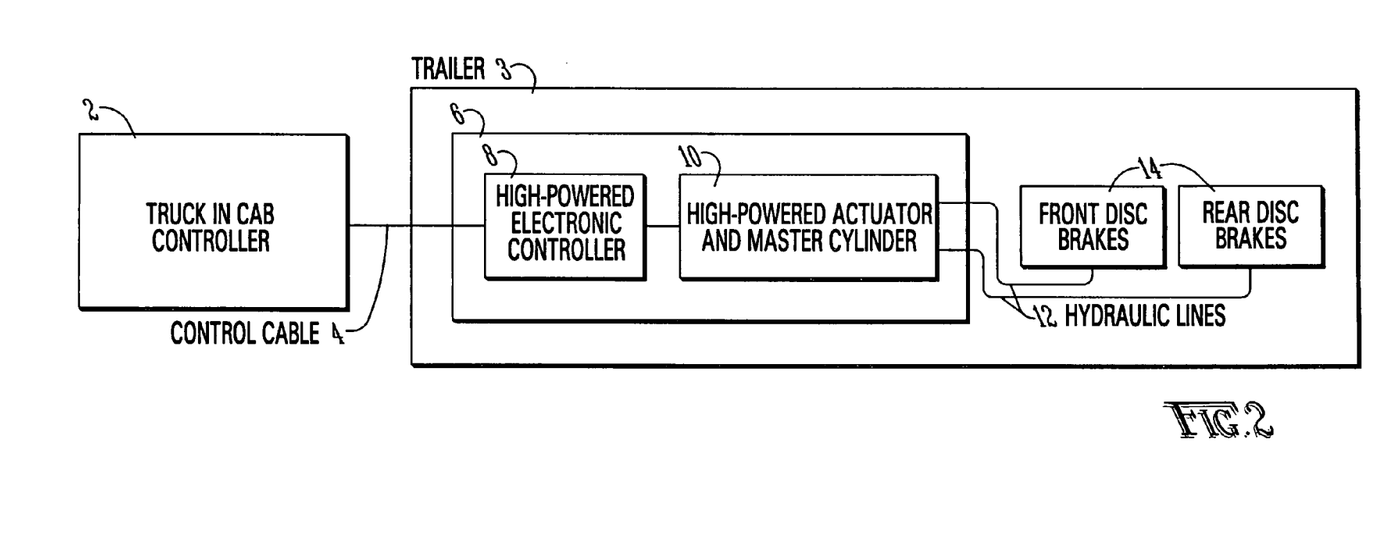
FIG. 2 is a block diagram showing major components of a preferred embodiment of the present invention.

With reference to FIGS. 1 and 2, an overall description of the preferred embodiment of the present invention may be described. In the preferred embodiment, vehicle 1 is used to pull trailer 3. Various types of towing vehicles in combination with various types of trailers may be utilized in alternative embodiments, although a standard truck and recreational trailer are illustrated in FIG. 1. Braking control is provided by in-cab control unit 2, which is in communication with trailer control unit 6 by means of control cable 4. In-cab control unit 2 may be implemented by any of a number of commercially available products for use with the present invention, one example of which is the Prodigy controller manufactured by Cequent Electrical Products of Tekonska, Mich. In-cab control unit 2 preferably includes a means to change the sensitivity of its output, as in the from of a "gain" control feature on the unit. The gain may be used to adjust the braking of the overall system during operation, the proper setting determined by a calibration prior to towing. Periodic adjustment may be required, depending upon the particular in-cab control unit 2 that is employed, and maladjustment of the gain control on in-cab control unit 2 may cause unnecessary braking at trailer 3.

As shown in the block diagram of FIG. 2, trailer control unit 6 is comprised of electronic controller 8 and actuator/master cylinder unit 10. Disc brakes 14, in communication with wheels 16 of trailer 3, are controlled hydraulically from actuator/master cylinder unit 10 by means of two hydraulic lines 12. It should be noted that while disc brakes 14 are used in the preferred embodiment, alternative embodiments of the invention may be employed in conjunction with drum brakes or any other type of brakes incorporating hydraulic functionality. The use of dual hydraulic lines is a safety feature, since a failure in one hydraulic line 12 will not cause a complete brake failure at trailer 3. In alternative embodiments, however, only a single brake line may be used, or additional brake lines may be employed in a configuration that may, for example, match the number of axles or number of brakes employed on trailer 3.

Figure 3:
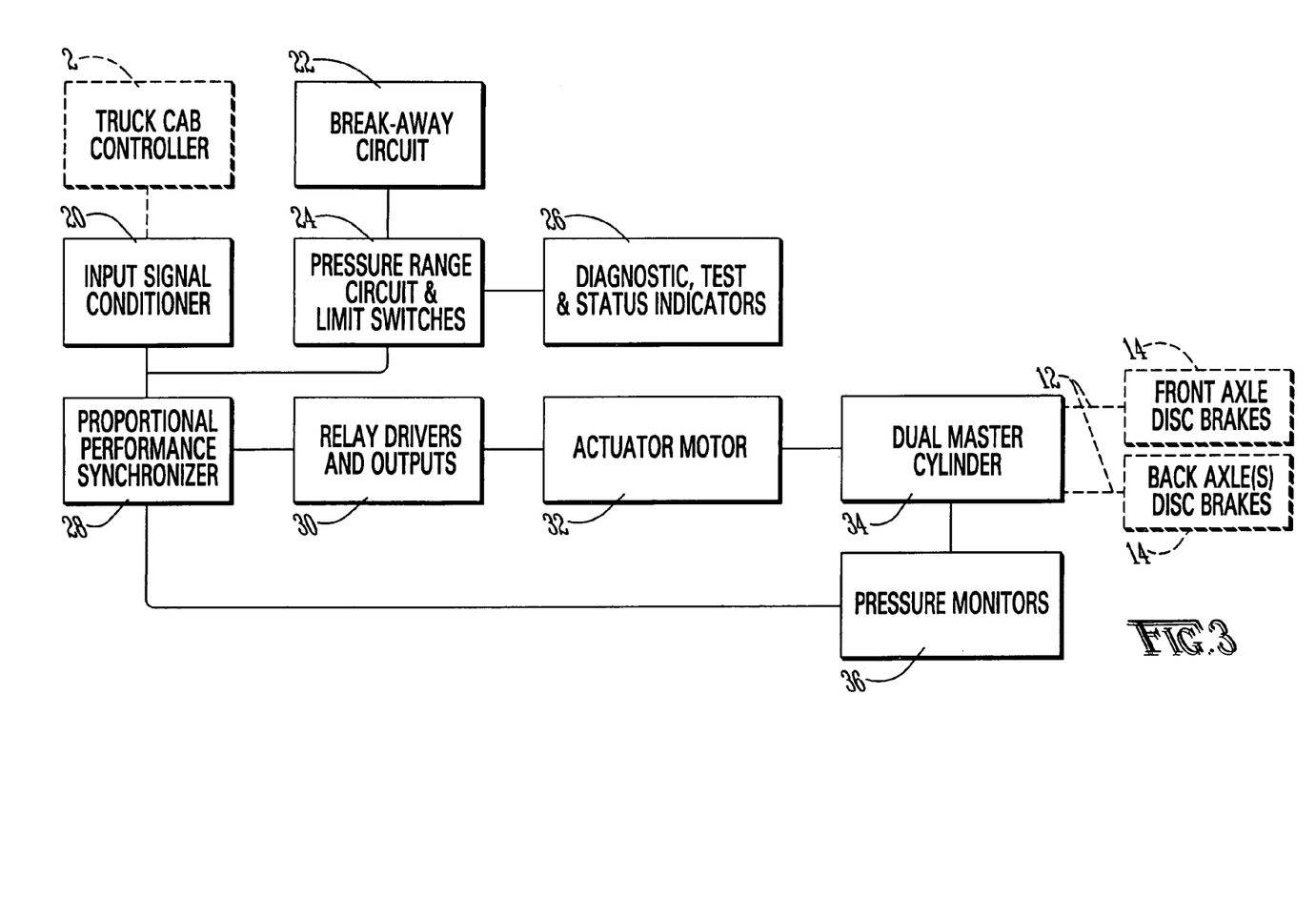
FIG. 3 is a block diagram showing the major functional elements of the trailer controller unit according to a preferred embodiment of the present invention.

Referring now to FIG. 3, the major functional components of trailer control unit 6 may now be described. A control signal from in-cab control unit 2 travels along control cable 4 to input signal conditioner 20 of trailer control unit 6. Depending upon the design of in-cab control unit 2, the signal received at input signal conditioner 20 is generally in the form of a pulse-width modulated (PWM) signal. Input signal conditioner 20 serves to filter and condition this signal to result in a pure analog output signal that is usable by the other components of trailer control unit 6.

Proportional performance synchronizer 28 receives as input the signal output from input signal conditioner 20. Proportional performance synchronizer 28 also receives an input from pressure monitors 36. Pressure monitors 36 are in communication with dual master cylinders 34, and function to sense the pressure generated in each of the two channels of dual master cylinder 34 at any given time. Proportional performance synchronizer 28 also receives as input the signal from break-away circuit 22, pressure range circuit and limit switches 24, and diagnostic, test and status indicators 26. Break-away circuit 22 serves to provide a braking function for trailer 3 in the event that trailer 3 becomes separated from vehicle 1 during operation. The laws applicable in many states require that trailers of a certain minimum weight must provide a break-away braking function. These laws generally require that the trailer brakes be automatically applied under break-away conditions for a minimum of fifteen minutes. Pressure range circuit and limit switches 24 serve to ensure that the output of proportional performance synchronizer 28 does not cause the operation of the trailer braking system to exceed pre-set system operational limits. Finally, diagnostic, test and status indicators 26 serve to ensure that the output of proportional performance synchronizer 28 responds appropriately to a change in the status of hydraulic pressure produced by dual master cylinder 34, specifically a loss of line pressure, or to other events related to the operation of either channel of brakes 14, including a complete failure of either channel of brakes 14.

Proportional performance synchronizer 28 communicates with relay drivers and outputs 30 by means of an output signal, which in turn drives actuator motor 32. Actuator motor 32 preferably drives a simple linear actuator, which serves to apply pressure responsive to the output from proportional performance synchronizer 28 to each side of dual master cylinder 34. Dual master cylinder 34 thus drives brakes 14 by means of hydraulic lines 12.

Figure 4:
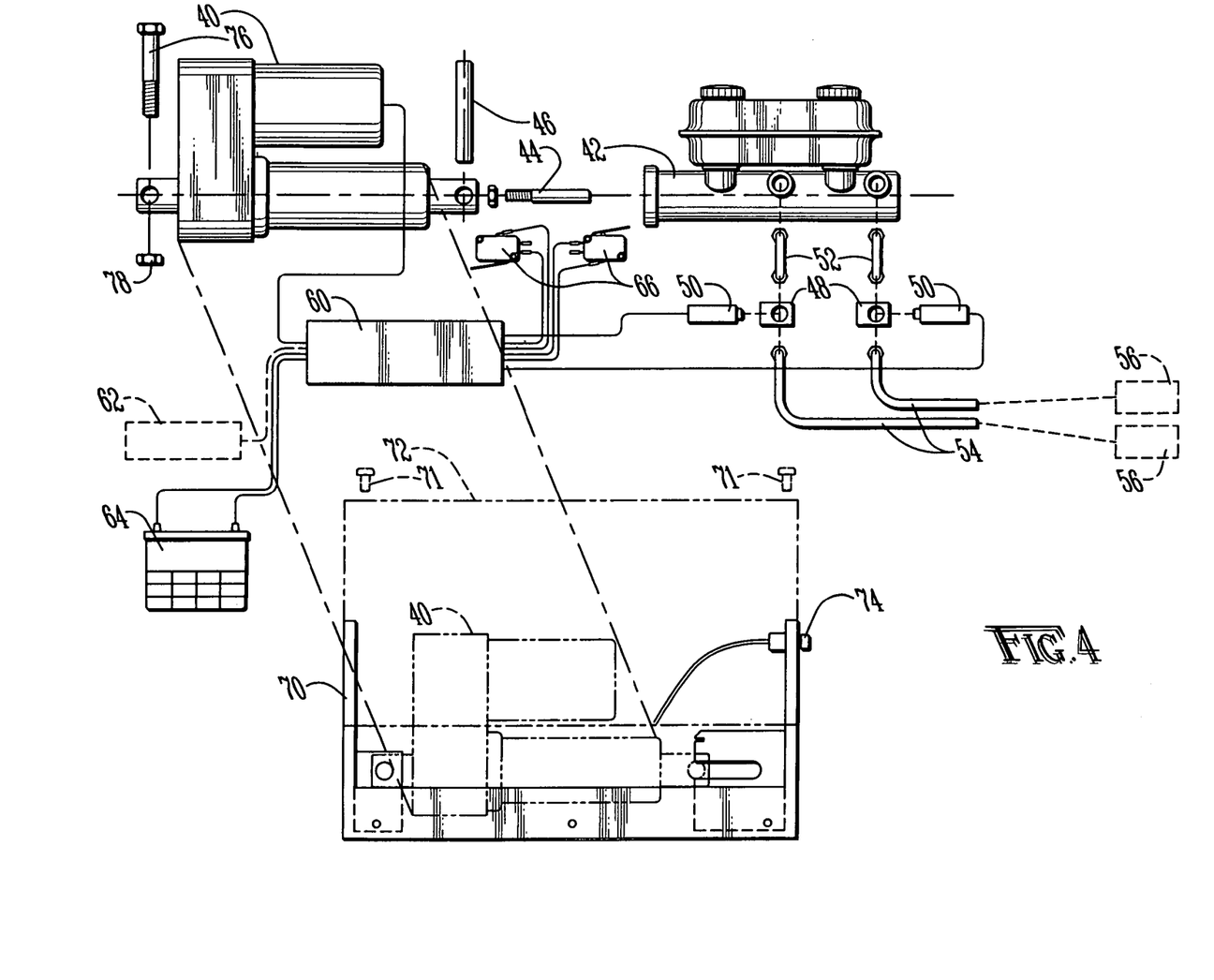
FIG. 4 is an exploded elevational view of the major mechanical components of a preferred embodiment of the present invention.

Referring now to FIG. 4, the mechanical components of a preferred embodiment of the present invention may now be described in greater structural detail. Linear actuator 40 is aligned along its horizontal extension axis with the bore of dual-channel hydraulic master cylinder 42. Linear actuator 40 is preferably an "off the shelf" component in order to reduce system costs, an acceptable component being, for example, model no. D12-10B5-02TB from Danaher Motion LLC of Chicago, Ill. Likewise, master cylinder 42 is also preferably a standard, commodity part for the sake of reducing system cost, an appropriate component being the model 260-4892 master cylinder from Wilwood Engineering of Camarillo, Calif. Linear actuator 40 communicates with the bore of master cylinder 42 by means of push rod 44. Centering pin 46 holds push rod 44 in place with respect to linear actuator 40. It may be seen that by activation of linear actuator 40, that is, by extension and retraction under influence of the motor of linear actuator 40, increased or decreased pressure is applied to the pistons in the bore of master cylinder 42 through the movement of push rod 44. As a result, the hydraulic pressure in each channel of master cylinder 42 rises or falls in proportion to the extension and retraction, respectively, of linear actuator 40. This direct mechanical linkage provides a rapid braking response once a control signal is received. The mechanical simplicity of this arrangement reduces the likelihood of system failure. In addition, this arrangement provides for the capacity of releasing the brakes of trailer 3 at a rapid speed, as fast or faster as the brakes may be applied. This is a natural result of the employment of a linear actuator in this manner with the assistance that the backpressure present on master cylinder 42 provides during retraction.

Each of two pressure transducers 50 are in hydraulic communication with a corresponding channel of master cylinder 42 by means of hydraulic tees 48, which are in turn in communication with hydraulic connecting lines 52. In a preferred embodiment, pressure transducers such as model M3431-XXXX-601KPG manufactured by Measurement Specialty of Hampton, Va. may be used, although other devices to perform this function are known and may be substituted in alternative embodiments. The Measurement Specialty transducer is a high-reliability model specified for 0–3000 psi measurements. Pressure transducers 50 are operable to measure the pressure within each of the corresponding hydraulic tees 48, which, because each of the hydraulic tees 48 are in fluid communication with a channel of master cylinder 42, corresponds to the pressure currently produced in each channel of master cylinder 42. Pressure transducers 50 produce an electrical signal, the voltage of which is proportional to the pressure sensed by transducers 50. This hydraulic pressure is further transferred past transducers 50 through brake lines 54 to front and rear brake calipers 56. Brake calipers 56 may be of any conventional design, such as model no. DBC-225-E manufactured by Kodiak of Fort Worth, Tex. Thus a change in pressure generated by a channel in master cylinder 42 is transferred to brake calipers 56, resulting in a braking force directly proportional to this hydraulic pressure. It should be noted that while calipers 56 are employed in the preferred embodiment, alternative embodiments of the invention may function with drum brakes as well. In addition, alternative embodiments of the invention may employ a cast housing with channels and access ports to replace certain hydraulic system components, such as hydraulic tees 48 and hydraulic connecting lines 52.

Towed vehicle brake controller 60 is preferably implemented as various electrical and electronic components situated on a single circuit board. Brake controller 60 receives as input the signals from pressure transducers 50 as well as a signal from in-cab control unit 62. Brake controller 60 generates an output that is sent to linear actuator 40, thereby controlling the degree to which linear actuator 40 extends or retracts, and thus controlling the braking pressure at brake calipers 56. Brake controller 60 also receives input signals from actuator limit switches 66. Brake controller 60 is powered by battery 64. In the preferred embodiment battery 64 is mounted on trailer 3 as a supplemental battery, and is in communication with the battery of vehicle 1, although in alternative embodiments the supplemental battery may be eliminated and the system run from the battery of vehicle 1 through power connections between vehicle 1 and trailer 3. It should be noted, however, that in the case when the supplemental battery is eliminated from the system, the breakaway feature is defeated since it requires battery power in order to operate.

As further illustrated in FIG. 4, the preferred embodiment of the present invention preferably comprises a case base plate 70 and case cover 72. The purpose of case base plate 70 is to provide a convenient means to mount the system's various mechanical and electrical components, and case cover 72 serves to protect the system from damage. Case cover 72 may be attached to base plate 70 by means of machine screws 71, although other secure but removable means of attaching these components may be employed in alternative embodiments. Test switch 74, operable to test the function of the control components of the preferred embodiment, is in communication with brake controller 60. Test switch 74 may preferably be mounted in the wall of case cover 72 for ease of access by the operator. To secure linear actuator 40 with respect to base plate 70, bolt 76 and nut 78 may be employed as shown in FIG. 4. Other components of the preferred embodiment may be secured within base plate 70 and case cover 72 as convenient for operation, preferably in a configuration lay-out as generally shown in FIG. 4. Base plate 70 may be mounted on trailer 3 in any convenient location, preferably such a location as may serve to protect the system components from damage during use, such as against the frame of trailer 3.

Figure 5A:
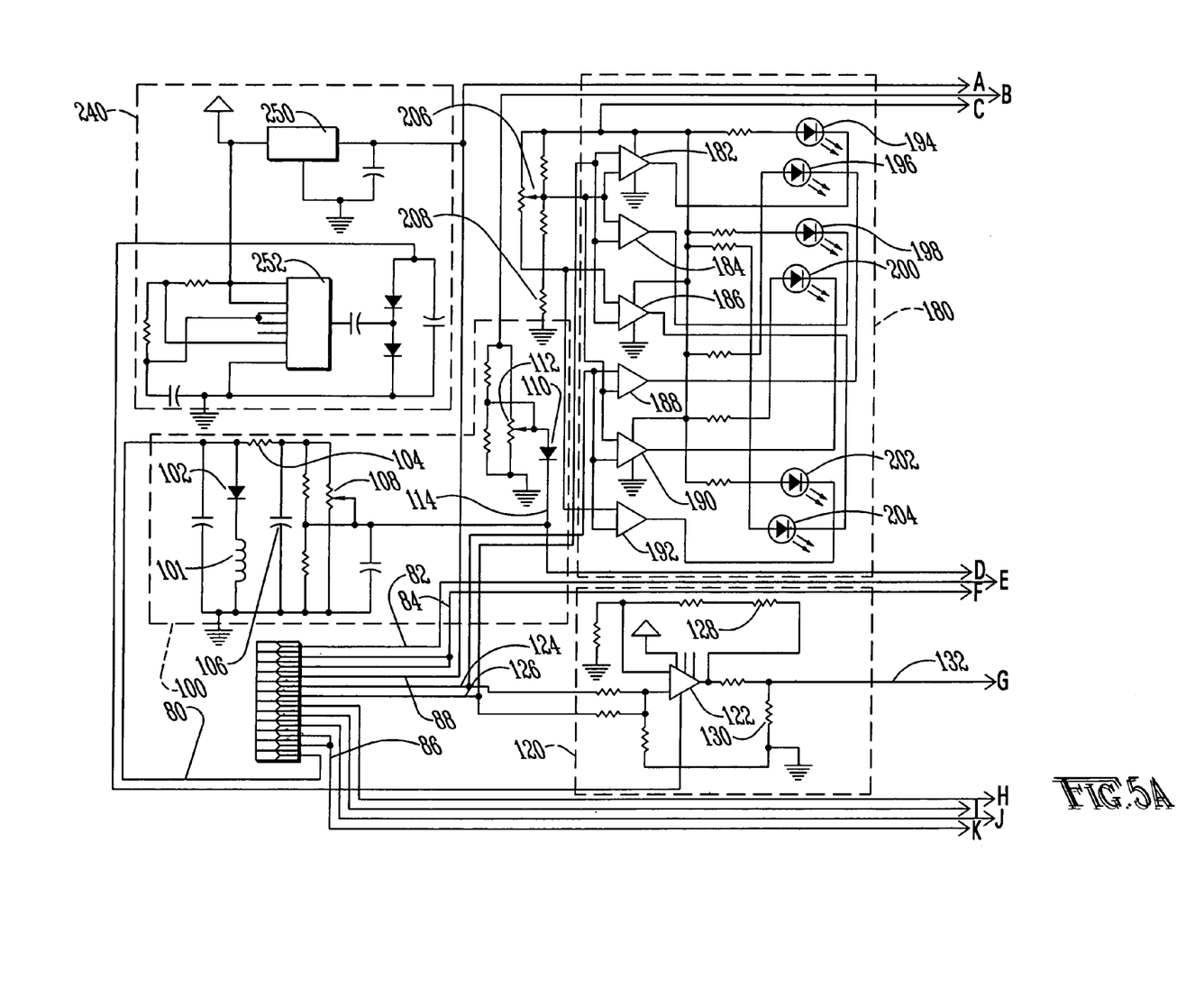
FIGS. 5A and 5B are a circuit diagram showing the major electrical components of the trailer brake control system according to a preferred embodiment of the present invention.
Figure 5B:
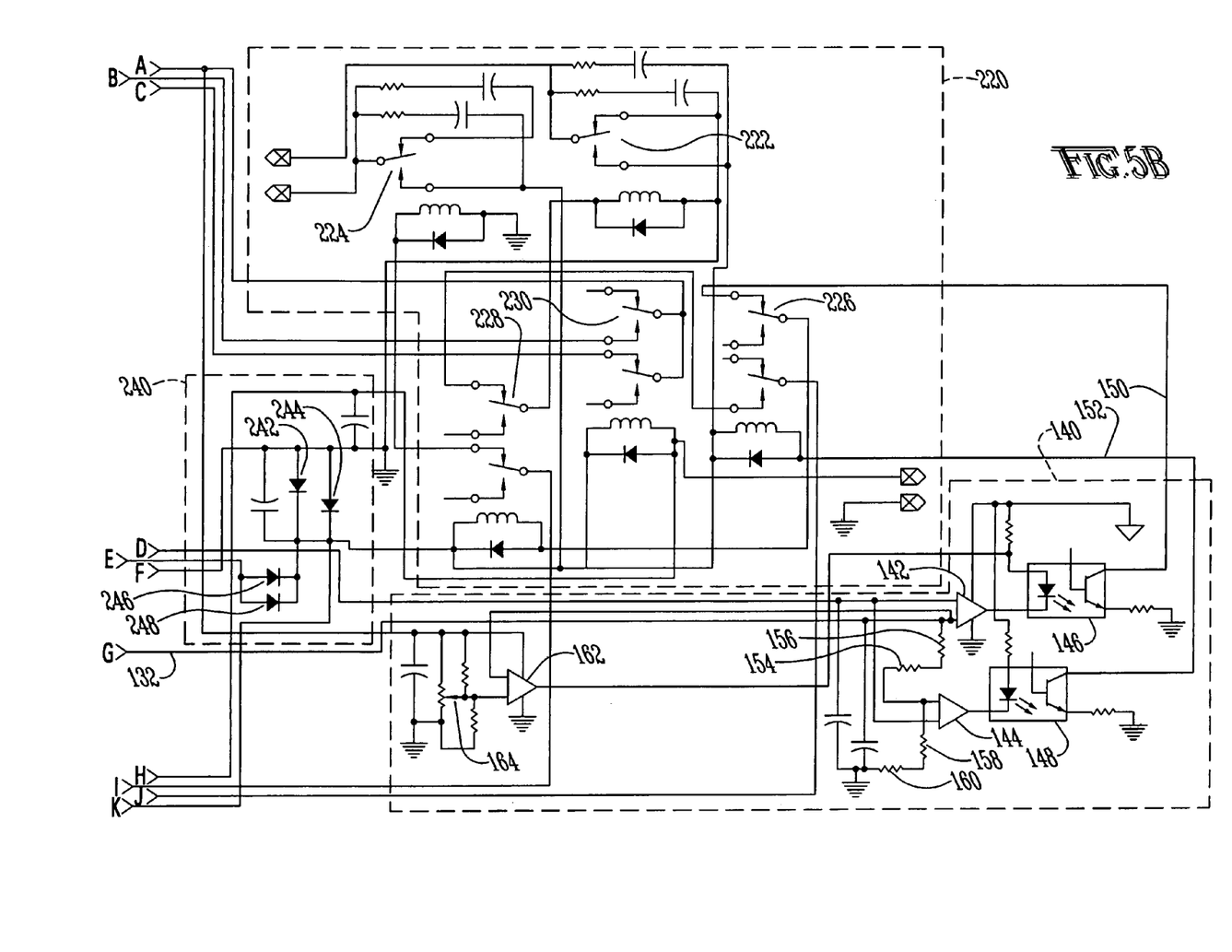

Referring now to FIGS. 5A and 5B, the electrical and electronic components of brake controller 60 of the preferred embodiment may be described in greater detail. A cab control signal is input to brake controller 60 from in-cab control unit 2 along cab control signal line 80. In the preferred embodiment, the signal on cab control signal line 80 is a 12V DC base signal, with a modulated pulse width corresponding to the amount of braking needed at trailer 3 as determined by in-cab control unit 2. Towing vehicle power line 82 is used to feed a 12V DC power source to the preferred embodiment, and towing vehicle ground line 84 provides a system ground. Like cab control signal line 80, which passes along control cable 4 as shown in FIG. 1, towing vehicle power line 82 and towing vehicle ground line 84 are passed along dedicated cables between truck 1 and trailer 3 (not shown for clarity in FIG. 1). As explained above, an auxiliary battery (not shown) may be employed in connection with the preferred embodiment, such auxiliary battery typically being located somewhere on trailer 3. In the preferred embodiment where an auxiliary battery is in fact employed, auxiliary power line 86 is also received as an input to brake controller 60.

The various components of brake controller 60 in a preferred embodiment may be described with reference to a plurality of sub-circuits shown in FIGS. 5A and 5B. These sub-circuits are defined based on their various functions. Cab control sub-circuit 100 provides an interface between in-cab control unit 2 and brake controller 60. Cab control sub-circuit 100 conditions the input from in-cab control unit 2 into a form that is usable by the other components of brake controller 60, and provides an inductive load to in-cab controller 2 in order to indicate to in-cab control unit 2 that a towed vehicle is in fact connected. Most commercially available in-cab control units require this inductive load in order to sense that both an electric brake is present and that the braking connection is made.

Diode 102 of cab control sub-circuit 100 provides current fly-back protection for the inductor circuit, which includes inductor 101. Resistor 104 and capacitor 106 form an RC filter with respect to the control signal from in-cab control unit 2. This RC filter functions to condition the PWM signal into a pure DC signal, based on the DC component of the PWM signal. As a result, variable DC signals from in-cab control unit 2 merely pass through this RC filter. Variable resistor 108 functions as a voltage divider to transition the output voltage into a range of 0 to +4.5V DC for the input to the comparator circuit described below. While a variable resistor 108 has been used in the preferred embodiment, a static resistor or resistor set may be substituted in alternative embodiments once an ideal output voltage value is determined for a production model of the preferred embodiment.

Another input to cab control sub-circuit 100 is reference voltage source 88. Reference voltage source 88 is preferably maintained at +5V DC. Reference voltage source 88 is used in cab control sub-circuit 100 for emulating cab control signal 80, for the purposes of providing a test feature and to provide a cab signal source for the breakaway safety feature of the preferred embodiment. Reference voltage source 88 is fed into the conditioned cab control signal passing from variable resistor 108 through reverse-flow blocking diode 110. Variable resistor 112 provides a voltage divider for this reference voltage. It may be seen that this circuitry allows the test and breakaway circuits to run at a factory-determined maximum pressure setting rather than at the full travel of linear actuator 40. In the preferred embodiment, the test pressure at initial release is set to about 1000 psi. It may be noted that in an alternative embodiment intended as a full production model, a static resistor or resistor set of appropriate parameters may be substituted for variable resistor 112. It may be seen that the output of cab control sub-circuit 100 is a conditioned cab control signal that passes along conditioned cab control signal line 114.

Transducer conditioning sub-circuit 120 performs two functions as a part of brake controller 60. First, it adds the outputs of each transducer 50 together. In the preferred embodiment, two transducers are employed, each corresponding to one of the channels of dual-channel hydraulic master cylinder 42. Second, transducer conditioning sub-circuit 120 divides the resulting sum by the total number of transducers to reach an average output value. Since two transducers 50 are employed In the preferred embodiment, the dividing step is a division of the sum value by approximately two. The summation function is performed by operational amplifier 122, which is configured in a non-inverting summing mode as will be recognized by those skilled in the art. The DC values from each pressure transducer 50, received at transducer signal lines 124 and 126, are added together by operational amplifier 122 and its related circuitry. The result is a signal whose voltage is equal to the sum of the transducer 50 signal voltages. The division function is performed by the voltage divider network formed by resistors 128 and 130. The overall effect is to generate an output signal voltage that is the average value of the input signals along transducer signal lines 124 and 126. This transducer average signal is output along transducer average signal line 132.

It may be noted that in the preferred embodiment as illustrated in FIGS. 5A and 5B, the transducer average signal available at transducer average signal line 132 will in fact be slightly less than the true desired value because each transducer 50 provides a +0.5V DC offset voltage at zero hydraulic pressure. The offset voltage is a safety feature in the design of transducers 50, since the absence of this minimum voltage may be used as an indication of a failure in the corresponding transducer 50. (This feature is in fact employed in the preferred embodiment, as explained below.) The resulting slight discrepancy in the value of the signal available at transducer average signal line 132 is preferably addressed in the design of the comparator aspects of brake controller 60.

The function of comparator sub-circuit 140 is to compare the average transducer signal, based on the value output from transducer conditioning sub-circuit 120 at transducer average signal line 132, to the value at conditioned cab control signal line 114 output from cab control sub-circuit 100. Based on the results of this comparison, comparator sub-circuit 140 generates an output to adjust linear actuator 40, and thereby manipulate disc brake calipers 56. Specifically, transducer average signal line 132 and conditioned cab control signal line 114 are both fed to each of voltage comparators 142 and 144. The output from voltage comparators 142 and 144 is received as an input at optical drivers 146 and 148, respectively. Voltage comparator 142 functions to determine if the value at conditioned cab control signal line 114 is greater than the value at transducer average signal line 132. If so, the LED of optical driver 146 is activated, which in turn causes an "extend" output signal from comparator sub-circuit 140 at extend output signal line 150. As will be seen, this signal is used to extend push rod 44 by manipulation of linear actuator 40, thereby applying hydraulic pressure that increases the braking force applied through brake calipers 56. Voltage comparator 144 functions to determine if the value at conditioned cab control signal line 114 is less than the value at transducer average signal line 132. If so, the LED of optical driver 148 is activated, which in turn causes a "retract" output signal from comparator sub-circuit 140 at retract output signal line 152. This signal is used to retract push rod 44 by manipulation of linear actuator 40, thereby reducing hydraulic pressure and thus decreasing the braking force applied through brake calipers 56. Although optical drivers are employed in the preferred embodiment, it will be recognized by those skilled in the art that various other forms of drivers may be employed in alternative embodiments within the scope of the invention.

Resistors 154, 156, 158, and 160 are employed to form voltage dividers in connection with the signal at transducer averaged signal line 132. The purpose for these voltage dividers is to ensure that the transducer averaged signal value received at voltage comparator 144 is always slightly less than the transducer averaged signal value received at voltage comparator 142. This circuitry thus prevents a possible race condition between the outputs of voltage comparators 142 and 144. The particular type of voltage divider employed will depend upon the minimum granular control level that may be expected from the linear actuator 40 and master cylinder 42 employed in a particular embodiment, but the configuration shown in FIGS. 5A and 5B was found by the inventors to be compatible with the preferred embodiment of the present invention. Other voltage divider configurations may be employed in alternative embodiments in order to avoid a possible race condition between voltage comparators 142 and 144.

It may be seen from this description of the circuitry of comparator sub-circuit 140 in the preferred embodiment that with each "extend" or "retract" signal generated, a resulting change in average transducer pressure will result, which will lead to a corresponding change in the value at transducer averaged signal value line 132. When the value at transducer averaged signal line 132 matches the value at conditioned cab control signal line 114, then trailer controller 60 is at a "rest" condition. In this condition, there will be neither an "extend" or "retract" signal output from comparator sub-circuit 140, and linear actuator 40 will remain locked at its current position relative to master cylinder 42. When the value at conditioned cab control line 114 drops, as in the case when braking at trailer 3 is no longer needed, comparator sub-circuit 140 will generate a "retract" signal at retract output signal line 152, based on the result of the comparison at voltage comparator 144. Likewise, when the value at conditioned cab control line 114 drops, as in the case when additional braking at trailer 3 is needed, comparator sub-circuit 140 will generate an "extend" signal at extend output signal line 150, based on the result of the comparison at voltage divider 142. It will thus be seen that the braking applied by brake calipers 56 of trailer 3 is directly proportional to the difference between the average trailer brake pressure and the desired brake pressure, the latter as determined by in-cab control unit 2.

Also contained within comparator sub-circuit 140 is a safety limit circuit, the purpose for which is to ensure that the pressure generated in each channel of master cylinder 42 is maintained within a pre-determined safe working pressure range. Voltage comparator 162 is used to compare the value at averaged transducer signal line 132 to a set value. When the value at averaged transducer signal line 132 exceeds the set value, indicating that the system maximum pressure will be exceeded, voltage comparator 162 generates a signal that effectively serves as a short across the LED of optical driver 146, thereby shutting down optical driver 146 and preventing the output of an "extend" signal regardless of the results of the comparison at voltage comparator 142. The set value input to voltage comparator 162 is generated by feeding reference voltage source 88 into a voltage divider implemented as variable resistor 164. In the preferred embodiment, the set value corresponds to a maximum system pressure of about 1200 lbs. It should be noted that this maximum system pressure will vary substantially in alternative embodiments where drum brakes are substituted for disc brakes. Although a variable resistor 164 is used in the preferred embodiment, a full production model alternative embodiment may substitute a static resistor or resistor set in place of variable resistor 164.

Status indicator sub-circuit 180 functions to provide several status indicators with respect to trailer controller 60. In the preferred embodiment, status indicator sub-circuit 180 is only activated when test switch 74 is activated, or in a break-away condition if trailer 3 should become detached from vehicle 1. Since trailer controller 60 is, in the preferred embodiment, located in a remote location on trailer 3 itself, test switch 74 is not visible to the operator during the operation of vehicle 1, and test switch 74 thus may not be activated during the operation of vehicle 1. It is thus anticipated that an operator will likely only purposefully activate status indicator sub-circuit 180 while vehicle 1 and trailer 3 are stationary, or when the combination of vehicle 1 and trailer 3 is otherwise parked or at rest. It may be noted that in alternative embodiments, status indicator sub-circuit 180 may be moved to a location more convenient to the operator, including possibly a location visible while vehicle 1 is in operation. In other embodiments, status indicator sub-circuit 180 may include fewer components than illustrated in the figures or may be omitted entirely, since its purpose is only to provide diagnostic information to the operator.

It may be seen from FIGS. 5A and 5B that in the preferred embodiment status indicator sub-circuit 180 comprises a total of six comparators, three of which receive as an input the value at transducer receiver line 124, corresponding to one of transducers 50, and the other three receive as an input the value at transducer receiver line 126, corresponding to the other of transducers 50. Voltage comparators 182 and 188 operate to generate a "green" signal if the values at transducer receiver lines 126 and 124, respectively, indicate that transducers 50 have met a minimum working voltage within the normal operating range, which in turn corresponds to a minimum working pressure at the corresponding channel of master cylinder 42. The transducer receiver lines 126 and 124 are connected to the negative input terminals at voltage comparators 182 and 188, respectively, and thus a "green" signal from voltage comparators 182 and 188 results in the lighting of green LEDs 194 and 196, respectively.

Voltage comparators 184 and 190 operate to generate a "yellow" signal if the values at transducer receiver lines 126 and 124, respectively, drop below the normal operating range. The transducer receiver lines 126 and 124 are connected to the positive input terminals at voltage comparators 184 and 190, respectively, and thus generate a signal to activate yellow LEDs 198 and 200, respectively, when the pressure at the appropriate transducer 50 falls below the pressure value necessary to maintain the corresponding one of green LEDs 194 and 196 in the activated state.

Finally, voltage comparators 186 and 192 operate to generate a "red" signal if the values at transducer receiver lines 126 and 124, respectively, drop below the value indicating that transducers 50 are still providing their minimum current indicative of a zero pressure value. In the preferred embodiment, transducers 50 provide values on transducer receiver lines 126 and 128 of about 0.5V DC even when no pressure is detected, with a margin of error of about 0.01V DC, and thus in the preferred embodiment a "red" condition may be generated when the value at transducer receiver line 126 or 124 drops below about 0.485V DC. Transducer receiver lines 126 and 124 are connected to the positive input terminals at voltage comparators 186 and 192, and thus generate a signal to active red LEDs 202 and 204, respectively, when the pressure at the appropriate transducer 50 falls below the threshold value.

The other inputs to each of the six comparators are voltage references derived from the reference voltage source originating from reference voltage source line 88. A three-way voltage divider implemented using variable resistor 206 and static resistor 208 feeds a first reference voltage to comparators 182, 184, 188, and 190 (that is, the comparators used for determining whether a "green" or "yellow" condition exists), and a separate reference voltage to comparators 186 and 192 (that is, the comparators used for determining whether a "red" condition exists). It may be noted that a "green" condition exists in the preferred embodiment so long as the corresponding hydraulic line, as measured at the appropriate transducer 50, is operating above a minimum working pressure of about 800 psi. The green LEDs 194 and 196 will only light when this pressure or above is sensed at the corresponding transducer 50, and either test switch 74 is activated or a break-away condition has occurred. A "yellow" condition exists in the preferred embodiment whenever the working pressure in the corresponding hydraulic line, as measured at the appropriate transducer 50, has dropped below about 800 psi. The yellow LEDs 198 and 200 will only light when this pressure level is sensed at the corresponding transducer 50, and either test switch 74 is activated or a break-away condition has occurred. The "yellow" condition is thus indicative of a problem in the hydraulic circuit monitored by the corresponding transducer 50, such as may be caused by a leak of hydraulic fluid. Both a green LED and a yellow LED corresponding to the same hydraulic line cannot be simultaneously lit in the preferred embodiment. It should also be noted that the yellow LED 198 or 200 will remain lit until linear actuator 40 has forced the master cylinder 42 to move the hydraulic pressure in the applicable line above the minimum working pressure.

A "red" condition exists only when the minimum transducer 50 voltage is not detected on a particular line, and like the other LEDs the red LEDs 202 and 204 will only light upon the occurrence of this condition and either the activation of test switch 74 or a break-away condition. The "red" condition is indicative of a problem with the circuit communicating with the corresponding transducer 50, or with the corresponding transducer 50 itself. It may be noted that although green, yellow (or amber), and red LEDs have been employed in the preferred embodiment owing to the common associations between these colors and the system status levels they represent, any other color LEDs could be used in alternative embodiments, as could various other forms of indicators as are known to those skilled in the art.

The function of motor control sub-circuit 220 is to energize the linear actuator 40 in response to output signals from comparator sub-circuit 140. In the preferred embodiment, two single-pole, double-throw, high-power relays 222 and 224 are employed in motor control sub-circuit 220 to deliver voltage to linear actuator 40. In the rest state, the relays 222 and 224 function to short the contacts of linear actuator 40 together and to ground, thereby providing dynamic braking to trailer 3. Whenever relay 224 is energized, a voltage is applied to linear actuator 40 causing it to extend push rod 44; conversely, whenever relay 222 is energized, a voltage is applied to linear actuator 40 causing it to retract push rod 44. Whenever both relays 222 and 224 cease to be energized, each returns to a short-circuit state that provides dynamic braking.

An arc suppression circuit is employed with respect to each of the high-power relays in the preferred embodiment, comprised of a bipolar capacitor and a resistor placed in parallel with the wiper of the relay between the common contact of each of the normally open and the normally closed contacts. The arc suppression circuitry retards the change in potential between the contacts, allowing the air gap at the contacts to widen before an arc is formed. The arc suppression circuitry thus lowers the operating temperature of the relay contacts, and thereby extends the operating life expectancy of the high-power relays.

Low-power relays 226 and 228 provide the necessary coil voltage to high-power relays 222 and 224, respectively. It may be noted that in the circuit arrangement of FIGS. 5A and 5B, low-power relays 226 and 228 are connected in such a way as to ensure that high-power relays 222 and 224 cannot be activated simultaneously; in other words, high-power relays 222 and 224 are interlocked. Low-power relay 226 is energized by a signal along retract output signal line 152, while low-power relay 228 is energized by a signal along extend output signal line 154. Both high-power relays 222 and 224 receive a voltage of +12V DC to their coils from the mechanical limit switches (not shown) located on the shaft of linear actuator 50. These limit switches ensure that linear actuator 50 does not retract too far (for high-power relay switch 222) or extend too far into the master cylinder (for high-power relay switch 224). In the preferred embodiment, these switches operate in a normally closed position, and thus break their respective circuits when contacted.

Also forming a part of motor control sub-circuit 220 is certain break-away circuitry, including relay coil 230. Upon closure of the break-away switch (not shown) as caused by a break-away condition, relay 230 operates to apply a voltage to comparator sub-circuit 140. This voltage is limited by the voltage divider formed by resistor 112 of cab control sub-circuit 100. This voltage in turn causes motor control sub-circuit 220 to drive linear actuator 40 forward, thereby applying pressure to the brakes of trailer 3 by means of brake calipers 56. In a preferred embodiment, the break-away switch is normally closed, held open by a pin attached to a cable. The opposite end of the cable is attached to vehicle 1, thereby resulting in the removal of the pin upon separation of vehicle 1 and trailer 3, as in a break-away condition. Numerous such break-away switches are known in the art, such as supplied by Titan Tire Corporation of Des Moines, Iowa as part no. 4822100. Various other types of break-away switches may be employed in alternative embodiments of the present invention.

Voltage conditioning sub-circuit 240 (illustrated in the figures as two non-adjacent areas in the circuit diagram) serves the purpose of conditioning the power received by trailer controller 60 from the battery of vehicle 1. Voltage conditioning sub-circuit 240 receives as input a voltage of +12V DC from the battery of vehicle 1. It must output three voltages to ensure proper operation in the preferred embodiment, and also supplies a common ground for trailer controller 60. The first output is a protected +12V DC, which is provided primarily by the battery of vehicle 1 but also by the auxiliary battery of trailer 3. Diodes 242 and 244 are employed to protect trailer controller 60 in the event that the polarity of the connectors is inadvertently reversed during installation. Diodes 246 and 248 protect the electrical circuitry and electronic components of vehicle 1 by blocking reverse current flow should the auxiliary battery overtake the potential of the battery of truck 1.

The second output of voltage conditioning sub-circuit 240 is a stable +5V DC. This voltage is needed by transducers 50 and is used by the various reference voltage comparators employed throughout controller 60 to monitor status, limit pressure, and simulate cab control. The stable +5V DC voltage is provided by voltage regulator 250. Voltage regulator 250 may, for example, be implemented as a LM7805CT regulator, available from a number of semiconductor chip manufacturers. It should be noted that this source is chosen for the reference voltages due to its stability. Vehicle batteries, by contrast, may lose voltage as they discharge, and are not used as reference voltage sources in the preferred embodiment. Regulator 250 will provide a consistent +5V DC so long as the input voltage remains about +5V DC.

The third output of voltage conditioning sub-circuit 240 is a −12V DC voltage. This voltage is used by transducer conditioning sub-circuit 120 to properly bias operational amplifier 122. This negative voltage source is provided by timer 252. In the preferred embodiment, timer 252 is implemented as an LM555 integrated circuit, which is available from a number of semiconductor manufacturers. Timer 252 is configured to receive the +12V DC supply and generate a negative voltage in the range of −10V DC to −12V DC. This voltage is only used by operational amplifier 122 as a negative rail, and thus the precise voltage value is not critical so long as the voltage is greater than −9V DC.

It should be noted with regard to the power system connections in the preferred embodiment that the auxiliary battery for trailer 3 should preferably be implemented such that the common ground leads of the battery for vehicle 1 and the auxiliary battery are connected together. The auxiliary battery positive lead should be obtained from trailer controller 60. Trailer controller 60 should be connected directly to the battery of vehicle 1, and a unique connection to ground is considered a sound installation practice for purposes of safety.

The present invention has been described with reference to certain preferred and alternative embodiments that are intended to be exemplary only and not limiting to the full scope of the present invention as set forth in the appended claims.

What is claimed is:

1. A braking system for a vehicle and trailer system, comprising:
    (a) a master cylinder operable to hydraulically drive one or more sets of trailer brakes, said master cylinder comprising a bore;
    (b) a linear actuator comprising an extendible arm, said arm axially aligned with said master cylinder bore;
    (c) a plurality of transducers in hydraulic communication with said master cylinder; and
    (d) a controller in communication with said linear actuator and said transducers, and operable to manipulate said linear actuator, said controller comprising a transducer conditioning circuit operable to output an average transducer pressure value and comprising an adder in communication with said transducers to receive input from said transducers, and a divider in communication with said adder to receive input from said adder, and wherein said adder comprises an operational amplifier and said divider comprises at least one resistor.

2. The braking system of claim 1, further comprising an in-cab control unit in communication with said controller, wherein said controller transmits a control signal to said linear actuator and receives a pressure signal from each of said transducers and a brake signal from said in-cab control unit.

3. The braking system of claim 2, wherein each of said control signal, said pressure signals, and said brake signal comprise a value, and said control signal value is proportional to the difference between said average transducer pressure signal value and said brake signal value.

4. A brake system for a trailer, comprising:
    (a) a vehicle brake controller;
    (b) a master cylinder comprising a plurality of channels;
    (c) a linear actuator in communication with said master cylinder;
    (d) a hydraulic line connected to each of said master cylinder channels;
    (e) a brake connected to each of said hydraulic lines;
    (f) a transducer in communication with each of said hydraulic lines, said transducers operable to generate a signal corresponding to the hydraulic pressure in said hydraulic lines; and
    (g) a trailer brake controller in communication with said linear actuator, said transducers, and said vehicle brake controller, wherein said trailer brake controller comprises a transducer conditioning circuit which comprises an adder in communication with said transducers to receive input from said transducers, and a divider in communication with said adder to receive input from said adder, and wherein said adder comprises an operational amplifier and said divider comprises at least one resister.

5. The brake system of claim 4 wherein said brake controller further comprises a comparator circuit comprising:
    (a) a comparator in communication with said divider of said transducer conditioning circuit and said vehicle brake controller to receive input from said divider and said vehicle brake controller; and
    (b) a driver in communication with said comparator to receive input from said comparator.

6. The brake system of claim 5, wherein said comparator circuit comprises two comparators and two drivers, wherein a first driver is operable to send an extend signal to said linear actuator and a second driver is operable to send a retract signal to said linear actuator.

7. The brake system of claim 6, wherein said driver is an optical driver comprising an LED.

8. The brake system of claim 6, further comprising a motor control circuit comprising a first power relay in communication with said first driver, and a second power relay in communication with said second driver, said first and second power relays in communication with said linear actuator and operable to generate said extend signal and said retract signal, respectively, to said linear actuator.

9. The brake system of claim 8, wherein said motor control circuit further comprises a first low-power relay in communication with said first power relay, and a second low-power relay in communication with said second power relay.

10. The brake system of claim 8, further comprising a break-away circuit comprising a break-away switch and a break-away relay in communication with said break-away switch and said comparator circuit.

11. The brake system of claim 10, further comprising a status indicator circuit comprising:
    (a) a status comparator in communication with each of said transducers; and
    (b) an indicator in communication with each of said status comparators.

12. The brake system of claim 11, comprising a good-pressure status comparator in communication with each of said transducers and a low-pressure status comparator in communication with each of said transducers.

13. The brake system of claim 12, further comprising a malfunction status comparator in communication with each of said transducers.

14. The brake system of claim 13, wherein said indicators are LEDs.

15. A method of controlling a braking system comprising a vehicle brake controller operable to generate a brake signal, an actuator operable to receive a control signal, and a plurality of transducers each operable to generate a pressure signal, comprising the steps of:
    (a) receiving the brake signal from the vehicle brake controller and the plurality of pressure signals from the transducers;
    (b) converting the brake signal from a pulse width modulated signal to a pure analog signal;
    (c) computing the approximate average of the pressure signals;
    (d) computing the difference between the brake signal and the average pressure signal to create the control signal wherein the control signal comprises an extend signal and a retract signal;
    (e) receiving the control signal at the actuator; and
    (f) manipulating the actuator in response to the control signal wherein said manipulating step comprises one of the extension of the actuator, the retraction of the actuator, and the holding in place of the actuator;

(g) receiving from a break-away switch a break-away signal; and (h) extending the actuator in response to the break-away signal.

16. The method of claim 15, wherein said computing the approximate average step comprises the steps of summing the pressure signals and dividing the resulting sum by approximately the number of pressure signals.

17. The method of claim 15, further comprising the steps of:

(a) comparing each of the pressure signals to a reference signal to generate a status signal;

(b) activating an indicator in response to the status signal.

18. The method of claim 17, comprising the steps of generating a good-status signal and a low-pressure status signal.

19. The method of claim 17, further comprising the steps of generating a malfunction status signal.

* * * * *